United States Patent
Pandharipande et al.

(10) Patent No.: US 10,142,779 B2
(45) Date of Patent: Nov. 27, 2018

(54) CONTROLLING LOCALIZATION

(71) Applicant: PHILIPS LIGHTING HOLDING B.V., Eindhoven (NL)

(72) Inventors: Ashish Vijay Pandharipande, Eindhoven (NL); Sandeep Shankaran Kumar, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,321

(22) PCT Filed: Jan. 6, 2015

(86) PCT No.: PCT/EP2015/050084
§ 371 (c)(1),
(2) Date: Jul. 7, 2016

(87) PCT Pub. No.: WO2015/104251
PCT Pub. Date: Jul. 16, 2015

(65) Prior Publication Data
US 2016/0337796 A1   Nov. 17, 2016

(30) Foreign Application Priority Data
Jan. 7, 2014   (EP) .................................. 14150327

(51) Int. Cl.
*H04W 4/02*       (2018.01)
*H04L 29/12*      (2006.01)
(Continued)

(52) U.S. Cl.
CPC ......... *H04W 4/023* (2013.01); *H04L 61/6081* (2013.01); *H04W 4/02* (2013.01);
(Continued)

(58) Field of Classification Search
CPC .... H04L 61/6081; H04W 12/02; H04W 4/02; H04W 4/023; H04W 64/00; H04W 88/02
See application file for complete search history.

(56) References Cited

U.S. PATENT DOCUMENTS

2006/0018295 A1*  1/2006  Choi ..................... H04W 64/00
                                                    370/338
2010/0064373 A1   3/2010  Cai et al.
(Continued)

FOREIGN PATENT DOCUMENTS

EP      1626545 A2    2/2006
WO      9955114 A1    10/1999
(Continued)

OTHER PUBLICATIONS

Gedik, B., et al., "Protecting Location Privacy With Personalized K-Anonymity: Architecture and Alorithms," 2008 (35 Pages).
Liu, H., et al., "Survey of Wireless Indoor Positioning Techniques and Systems," IEEE Transactions on Systems, Man, and Cybernetics—Part C: Applications and Reviews, vol. 37, No. 6, 2007 (4 Pages).
3rd Generation Partnership Project; Technical Specification Group Services and System Aspects; Location Services (LCS); Service Description; Stage 1 (Release 11), 3GPP TS 22.071 V11.0.0 (2012) (50 Pages).
(Continued)

*Primary Examiner* — Kashif Siddiqui
(74) *Attorney, Agent, or Firm* — Meenakshy Chakravorty

(57) ABSTRACT

In one aspect, a mobile device is located using a signal sent out from the mobile device to nodes of a location network, and the mobile device also sends a tracking preference associated with the signal. This specifies whether a location network is permitted to use the signal to determine the mobile's location, and/or whether a provider of a location related service associated with a location network is permitted to make use of the location. In embodiments the pref-
(Continued)

erence may be tagged with the ID of a particular provider. In another aspect, the localization is based on measurements taken by a mobile terminal of signals sent from the nodes, and the nodes also send out an identifier with the signal identifying a provider of a location related service associated with the network. The mobile device can then use this identifier to determine who to share its measurements or location with.

8 Claims, 4 Drawing Sheets

(51) Int. Cl.
*H04W 12/02* (2009.01)
*H04W 64/00* (2009.01)
*H04W 88/02* (2009.01)

(52) U.S. Cl.
CPC ........... *H04W 12/02* (2013.01); *H04W 64/00* (2013.01); *H04W 88/02* (2013.01)

(56) References Cited

U.S. PATENT DOCUMENTS

| | | |
|---|---|---|
| 2011/0035284 A1 | 2/2011 | Moshfeghi |
| 2012/0202447 A1 | 8/2012 | Edge et al. |
| 2012/0202518 A1 | 8/2012 | Lim et al. |

FOREIGN PATENT DOCUMENTS

| | | |
|---|---|---|
| WO | 0131966 A1 | 5/2001 |
| WO | 2011001320 A1 | 1/2011 |

* cited by examiner

CONTROLLING LOCALIZATION

CROSS-REFERENCE TO PRIOR APPLICATIONS

This application is the U.S. National Phase application under 35 U.S.C. § 371 of International Application No. PCT/EP2015/050084, filed on Jan. 6, 2015, which claims the benefit of European Patent Application No. 14150327.6, filed on Jan. 7, 2014. These applications are hereby incorporated by reference herein.

TECHNICAL FIELD

The present invention relates to the ability of a location network to determine the location of a mobile device.

BACKGROUND

In an indoor positioning system, the location of a wireless device such as a mobile user terminal can be determined with respect to a location network comprising multiple anchor radios. These anchors are wireless nodes whose locations are known a priori, typically being recorded in a location database which can be queried to look up the location of a node. The anchor nodes thus act as reference nodes for location. Measurements are taken of the signals transmitted between the mobile device and a plurality of anchor nodes, for instance the RSSI (receiver signal strength indicator) and/or ToA (time of arrival) of the respective signal. Given such a measurement from three or more nodes, the location of the mobile terminal may then be determined relative to the location network using techniques such as trilateration or multilateration. Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites act as the reference nodes. Given signal measurements from a plurality of satellites and knowledge of those satellites' positions, the location of the mobile device may be determined based on similar principles.

The determination of the device's location may be performed according to a "device-centric" approach or a "network-centric" approach. According to a device centric approach, the mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

SUMMARY

In conventional indoor positioning techniques based on a network centric approach, a mobile device may be located using signals sent by the device and measured by the localization system. However, the device owner has no way to inform the system that he or she does not want to be localized. E.g. the signals may contain unencrypted identifiers, meaning that potentially anyone may be able to "sniff" the radio signals and localize the user. Somewhat similarly, in a device centric or assisted implementation the mobile device may take measurements of signals from the location network, then provide its location or measurements to a server. However, the user has no control over who can use that location. In other localization technologies such as GPS, the device may provide the user with the option to completely switch off the location technology. However, this is a rather blunt approach, e.g. the device is then left completely unlocatable to anyone or itself. It would be desirable to provide users with a different way of controlling the tracking of their location. E.g. it may be desirable to allow a device to continue broadcasting or gathering signals that have the potential to be used for localization, but with greater selectivity over who, when, where and/or in what circumstances information derived from such signals can be used for location purposes.

For instance, increasingly indoor positioning is being provided by different location network infrastructure providers belonging to different location servers. Given this trend, then for security or privacy reasons it may become increasingly desirable to provide users with the ability to choose when and/or by whom they can be localized. E.g. in order to preserve the user's privacy, in a network centric case it may be desirable to let the user decide whether to allow an indoor positioning system to track the user's movements, whether he or she wishes to be localized in a particular space, and/or which location providers are allowed to localize. In a device centric or assisted case, users may desire ways to securely identify providers so as to enable them to make decisions about sharing location data selectively at particular locations and/or with only specific providers.

The following disclosure provides a number of embodiments for preserving privacy by giving users control over their localization.

According to one aspect disclosed herein, there is provided a mobile device comprising a transmitter arranged to transmit a signal for use by one or more location networks to determine a location of the mobile device, and further comprising a location preferences module configured to include a tracking preference in the transmission from the transmitter. The tracking preference is transmitted in association with said signal, and specifies whether a location network is permitted to use said signal determine the location of the mobile device, and/or whether a provider of a location related service associated with a location network is permitted to make use of the location of the mobile device. The tracking preference is dependent on the location network or provider as identified by said identifier. The mobile device comprises a receiver configured to receive a respective identifier of each of a plurality of location networks and/or providers, each provider being a provider of at least one respective location related service associated with one of said one or more location networks. The location preferences module is configured to include in association with said signal: an instance of the tracking preference tagged with more than one of the identifiers to specify the permission permitted to each respective location network or provider, or more than one instance of the tracking preference each tagged with one of the identifiers to specify the permission permitted to each respective location network or provider.

Thus, the tracking preference may be recognized by some location networks or providers and not others, such that some are blocked from tracking the user's device while others are not. For example the relevant indoor positioning standard may require certain parties to always respect the tracking preference unconditionally. Alternatively or additionally, one or more location networks and/or providers of one or more location related services may send out an identifier (ID) of themselves to the mobile device, e.g. broadcast from one or more nodes of a location network that a particular provider is associated with, and the tracking preference of the device may be made dependent on the ID of the network or provider. For example if the user enters an area where an untrusted or undesired provider is operating in association with the location network currently encountered, then given that provider's ID the tracking preference may be set to "do not track"; whilst for other provider IDs in other areas tracking may be allowed.

Further, the mobile device tags the tracking preference it emits with the ID of one or more respective location networks and/or service providers to which that preference is directed, i.e. includes the ID in the transmission from the mobile device in association with the tracking preference and signal. In embodiments, the mobile device may send out multiple tracking preferences in association with its signal, each preference being tagged with the ID of one or more respective networks and/or providers to which that preference is directed. Thus the mobile device can specify different permissions for different location networks and/or different providers of location-related services by including their IDs in its transmission.

The location related service being provided by a given provider may comprise returning the determined location to the mobile device for information, e.g. to display a location of the user on a map shown on the device; and/or the service may comprise a location based service that is contingent on the location of the mobile device, e.g. location dependent control of a utility such as lighting, location dependent payments, or the provision of location based advertising or other information. The service may be a service provided for the benefit of the user of the mobile device, and/or a service provided for the benefit of another party (e.g. to track the user's behavior for marketing purposes).

In embodiments the tracking preference may explicitly specify one way or the other when tracking is and is not permitted (specifies one of "do not track" and "allow tracking"). Alternatively it may only be implemented based on a negative explicit indication ("do not track"), the absence of which implicitly specifies that tracking is allowed; or conversely it may only be implemented based on a positive explicit indication ("allow tracking"), the absence of which implicitly species that tracking is not permitted. The tacking preference may be a user setting set manually by the user, or may be a default setting of a particular device, or a setting set automatically by e.g. an application, or set in dependence on another user preference or a by communication provider (e.g. the user's cellular network provider). Further, note that specifying whether the signals or location are permitted to be used may mean specifying whether this is allowed at all, or it may mean the tracking preference is to be treated in combination with one or more other conditions (so controlling in what manner or what circumstances the signals or location are permitted to be used).

According to another aspect disclosed herein there is provided a network element of a location network, such as a location server. The location network is operable to determine a location of a mobile device based on signals received from the mobile device by nodes of the location network. A respective identifier identifies each of a plurality of location networks including said location network, and/or each of a plurality of providers each being a provider of at least one respective location related service associated with one of the location networks. the network element is configured to receive, in association with said signal, an instance of a tracking preference tagged with more than one of the identifiers, or more than one instance of the tracking preference each tagged with one of the identifiers. The tracking preference specifies whether the respective location network is permitted to use said signal to determine the location of the mobile device, and/or whether the respective provider is permitted to make use of the location of the mobile device. The network element is configured to respect one of the instances of the tracking preference if tagged with the identifier of its respective location network and/or provider.

According to another aspect disclosed herein, there is provided a node of a location network, the node comprising: a transmitter configured to transmit a signal for use by a mobile device to determine a location of the mobile device in combination with signals from other nodes of the location network; and an identification module configured to include, in association with the signal transmitted from said node, an identifier of the location network or a provider of a location related service associated with the location network. This allows the mobile device (or its user) to choose which networks or providers to share its measurements or location with, and therefore who has access to the possibility of tracking its location.

For instance, consider the example where there are multiple location networks or servers and one or more location-based application servers. The business model between the application server provider and the location networks or servers might be such that there is a preference for the application server to use particular ones of the location servers or networks, e.g. there may be a revenue sharing agreement that rewards location networks or servers if used to access a location-based service. Embedding an ID may enable an application server to identify which location network or server was used.

According to another aspect disclosed herein, there is provided a mobile device for use in a location network comprising multiple nodes, including at least one node configured with a location identification module as outlined above. For determining its location, the mobile device is configured to take measurements of the signals from a plurality of said nodes including said at least one node. The mobile device is further configured to share its measurements or location with a server providing a location related service based on the measurements or location, the mobile device being configured to share said measurements or location with the server in dependence on the identifier of the location network or provider as identified in the signal from said at least one node.

According to another aspect of the disclosure, there may be provided a system comprising the device, nodes and network element (e.g. location server) having any combination of the features outlined above. According to further aspects, there may be provided a computer program product configured to implement any of the above functionality of the mobile device when run on a mobile device, and/or a computer program product configured to implement any of the functionality of the network element (e.g. location server) when run on such an element, and/or a computer program product configured to implement any of the functionality of one or more of the nodes when run on one or more such nodes.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF EMBODIMENTS

Figure 1:
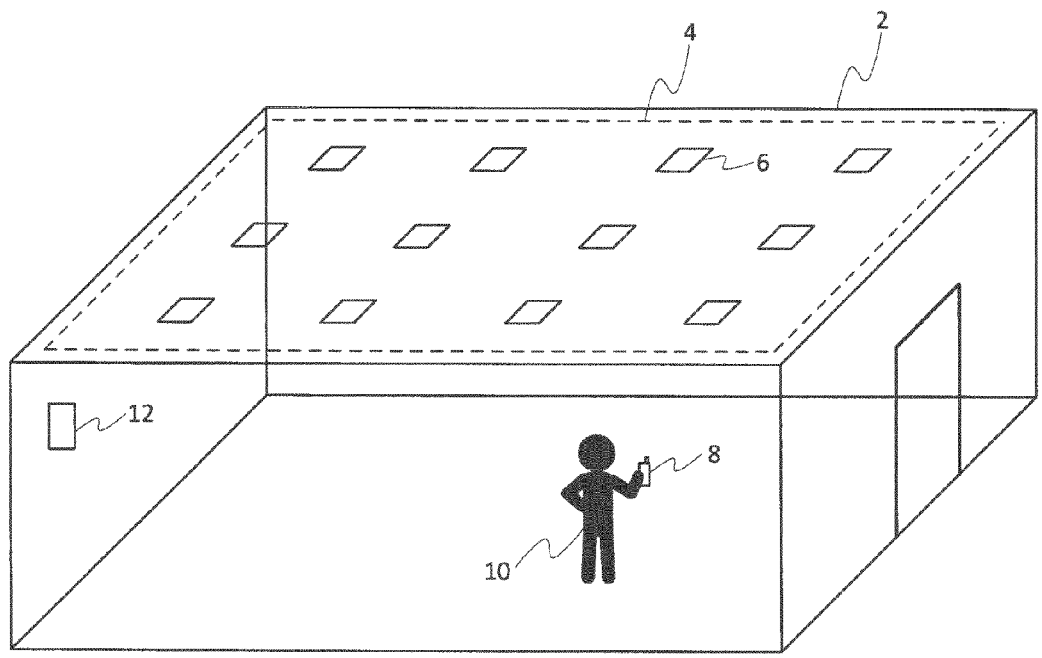
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations, as long as their locations can still be known. For example the reference nodes could instead be satellites of a satellite based positioning system such as GPS, GLONASS or Gallileo. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12 or object about which it is disposed.

Figure 2:
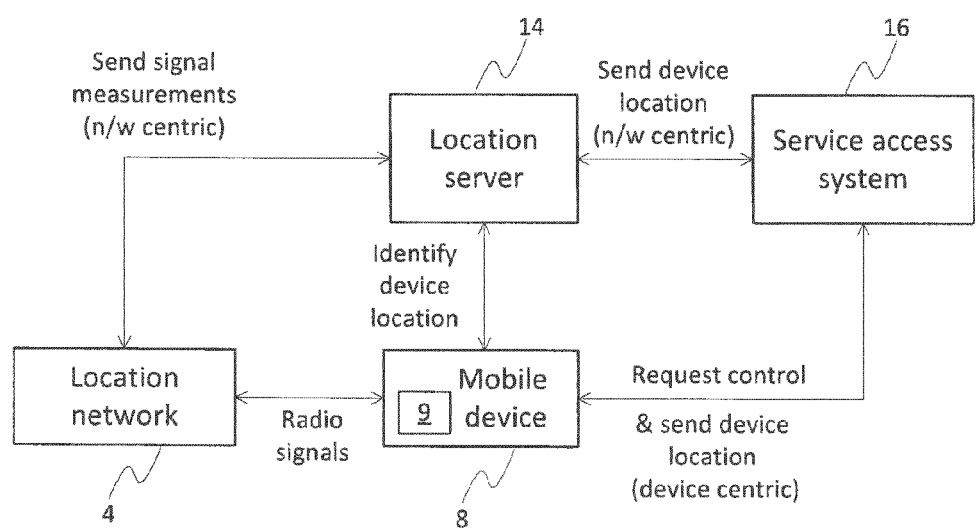
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi or Zigbee, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi or Zigbee, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi or Zigbee, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The mobile device 8 comprises a location module 9 configured to enable the mobile device to operate in accordance with the following. The location module 9 may be implemented in software stored on storage of the mobile device 8 and configured so as when executed on a processor of the mobile device 8 to perform the described operations. Alternatively it is not excluded that some or all of the functionality enabled by the location module 9 may be implemented in dedicated hardware circuitry, or configurable or reconfigurable circuitry.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location. In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

If such a signal measurement is available from each of a plurality of the anchor nodes 6, it is possible to determine the location of the mobile device 8 relative to the location network 4 using a technique such as trilateration, multilateration or triangulation. By combining this relative location with a known location of the anchor nodes 6 used in the calculation, it is then possible to determine the "absolute" location of the mobile device 8. The absolute location may for example refer to a geographic location in terms of the location on a globe or a map, or may refer to a location on a floorplan of a building or complex, or any real-world frame of reference having a wider meaning than simply knowing the location relative to the location network 4 alone. In a device centric approach the mobile device looks up the locations of the relevant nodes 6 by querying the location server 14 (e.g. via the wireless access point 12), or alternatively may receive the respective location along with the signal from each node 6. The mobile device 8 then performs the calculation to determine the absolute location at the device 8 itself. In a network centric approach on the other hand, the nodes 6 submit the signal measurements they took to the location server 14 (e.g. via the wireless access point 12), and the location server 14 performs the calculation of the absolute location at the server 14. In an example of an assisted or hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

Note that FIG. 2 shows various communications with arrows in all directions to illustrate the possibility of either device centric or network centric approaches, but in any given implementation not all the communications shown need be bidirectional or indeed present at all.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8 (e.g. providing the device 8 with information on exhibits as the user 10 walks about a museum, or information about products as the user 10 walks about a shop or mall); or accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi or Zigbee. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location.

Various indoor location networks and/or providers of location related services may be encountered as a user goes about his or her daily, weekly or monthly routine, such as those providing control of utilities, indoor navigation or location based advertising. Such services may bring benefits to the user, but there is also potential for unwanted intrusion or abuse. The following describes a number of additions to an indoor positioning system enabling a user to decide whether to allow the system to track his or her movements, in order to preserve the user's privacy.

As discussed, with increasing indoor positioning based on off-the-air signal measurements provided by different location network infrastructure providers belonging to different location servers, giving users ability to choose when and by whom they can be localized becomes increasingly important for security and privacy reasons. For example users may desire ways to securely identify location providers, to enable the users to make decisions about sharing location data selectively at particular locations and with only specific location providers. In one aspect of the following, location networks transmit an ID of the network infrastructure or the location server. In a device-centric system, this ID is used by the device to select which location network it intends to use and associate to. In another embodiment in a network-centric system, the device transmits a beacon to the network containing track or do-not-track information. In another aspect, the device can selectively associate track or do-not-track beacon information to specific location networks, and this may be based on the ID transmitted from the network. Thus the location server (or the like) is required to identify itself to a user device, and is required to wait for permission from the user device before tracking it. This allows only certain location networks to perform positioning of the user, while disallowing other location networks.

In a device-centric system, a mobile device 8 performs signal measurements, computes its location and then presents this to a server 16 of a location based service (LBS), or to a location server 14 which forwards the location to an LBS server 16. In an assisted case, the mobile device 8 performs the signal measurements but forwards these to a location server 14 which computes the device's location. The location server 14 may then forward the determined location to the LBS server 16. Alternatively the location server 14 may return the location to the mobile device 8, and if any further service is required the mobile device 8 may then forward its location to the LBS server 16. In the case where the location related service is simply to provide the location of the mobile device 8 to that device, the server of the relevant provider is the location server 14. In the case where the location related service is a location based service (some other service contingent on the location, e.g. control of lighting or provision of location based advertising) then the server of the relevant provider is the LBS server 16. Note that a location server 14 may be considered an element of a location network 4 in that it computes the location, and in embodiments may also be considered a provider of a service where it not only computes the location but returns this to the mobile device 8 to be used for some purpose at the device, 8, e.g. indoor navigation.

In another scenario, the mobile device 8 calculates its own position, but still has to refer to the location server 14 to look up the locations of the anchor nodes 6 it hears based on their node IDs as received in the signals from those nodes. This therefore involves submitting the currently heard node IDs to the server 14, which as a side effect may enable the provider of the location server 14 to determine the rough location of the mobile device 8 from knowledge of which nodes the device can currently hear (even if mobile device 8 does not particularly require the location server 14 to do so).

Thus it can be seen that, even in a device centric system, there are various scenarios whereby an operator of a location network 4 or associated server 14, 16 may have access to at least some information on the device's location. In such scenarios, it may be desired to preserve the privacy of the mobile device 8 in the sense of choosing which location servers 14 and/or LBS servers 16 to use, and therefore which to share such positioning information with, while disallowing any others by not sharing any positioning information with them.

To address this, in embodiments there is provided a device-centric positioning system wherein an ID of a provider of the location network 4 or a provider of a service associated with the location network is transmitted to a mobile device 8, and the mobile device 8 uses this to decide whether it intends to share its location or location related information with a specific server 14, 16. This ID could be an identifier of the location network 4, or an identifier of the location server 14 and/or LBS server 16 owned or operated by a provider to provide a location related service, or it could be an identifier of the party who is the provider such as a name or company ID (as opposed to an identifier of any particular network or network element). If the network is associated with a specific provider of a service, the ID of the network may also identify the provider, though in other situations the network ID does not necessarily identify a provider of a given service. The ID may contain additional information to prevent spoofing by unauthorized location network or location server.

Figure 7:
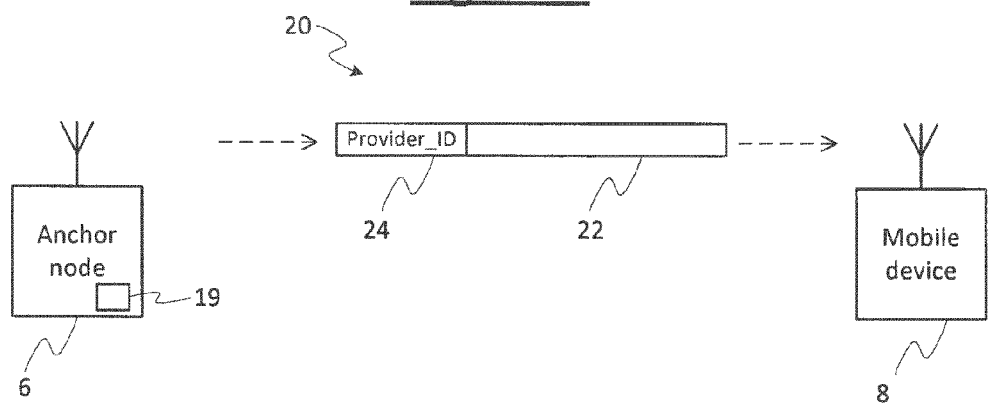
FIG. 7 is a schematic representation of a message format.

In embodiments the ID of the provider is transmitted to the mobile device 8 by being broadcast from one or more of the nodes 6 of the respective location network, along with the signals used for localization. Referring to FIG. 7, each of one or more anchor nodes 6 of each of one or more location networks 4 comprises an identification module 19 (e.g. implemented in software run on the node 6), which is configured to insert at least one identifier (ID) into the transmission emitted by that anchor node 6. This identifier identifies the respective location network 4 of which it is a part, or a provider of a location related service associated with the respective location network 4.

FIG. 7 illustrates an example message format which may be used to broadcast the transmission from each node 6. This may be a predetermined format, e.g. standardized by a particular localization standard to which multiple providers adhere and multiple location networks 4 are configured. The message format may be implemented at any suitable protocol layer of the protocol stack, e.g. at the application layer. A message 20 of this format may be transmitted repeatedly from the respective node 6, e.g. periodically (at regular intervals) or in response to events.

As shown schematically, each message 20 emitted from the anchor node 6 may comprise a first portion 22 comprising one or more first fields reserved for signaling the actual beaconing signal that will be used by mobile devices 8 to take signal measurements and thus determine their location. This first portion 22 of the message 20 may comprise any signal that can be used in the localization of a mobile device 8, e.g. for the mobile device 8 to take a signal strength or time-of-flight measurement and/or identify the node 6 or its location. For example this portion 22 of the message 20 may comprise a predetermined pattern that can be recognized by the mobile device 8, a timestamp marking the time the message 20 was transmitted from the node 6, the location of the node 6, and/or a node ID identifying the node 6.

In addition, the message 20 comprises a second portion 24 comprising a second field, in the form of a provider identification field reserved for specifying the identity of the provider of the relevant location network or associated service. This field 24 could also take multiple IDs in the case where multiple location networks 4 or service providers may be present. The provider identification module 19 is configured to insert the relevant identifier(s) into this dedicated second field for transmission.

Note however that it is not essential in all possible implementations that the transmission from the nodes 6 takes this predetermined format. For example, in other implementations the provider ID may be included in the transmission in an asynchronous fashion, as long as there is some protocol for associating it with the signal.

Figure 3:
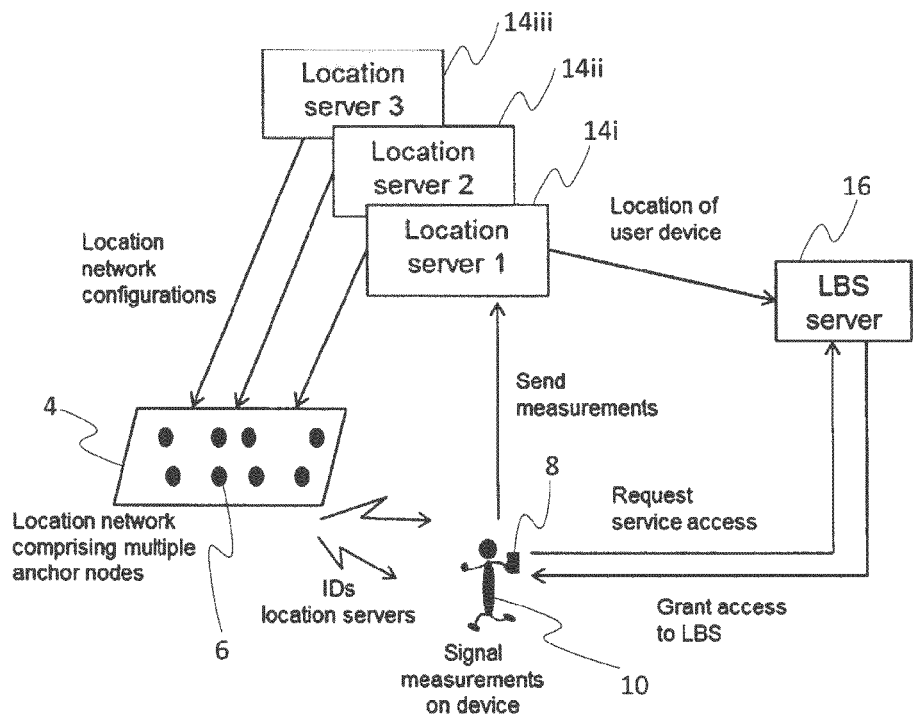
FIG. 3 is a schematic block diagram of a system for providing a plurality of location based services.

FIG. 3 shows a first embodiment of the present disclosure, in which multiple location servers 14*i*, 14*ii*, 14*iii* owned or operated by different providers share a common location network infrastructure 4 for positioning. Thus, there is a common location network 4 with anchor nodes 6 that different location servers 14*i*, 14*ii*, 14*ii* may use. The location servers 14*i*, 14*ii*, 14*iii* embed their location server IDs in the location network transmissions from the nodes 6, in order to announce their service availability at the location to the mobile device 8. On receiving these location server IDs, the mobile device 8 chooses one or more of these location servers 14*i*, 14*ii*, 14*iii* to share its location of location related information with, and thereby access the offered location related services. The choice on the mobile device 8 may for example be based on a user selection, or a pre-existing trust relationship, or due to a configuration on the mobile device 8. In embodiments, a particular application or applications on the mobile device 8 may have a preference to use one or more particular location servers 14*i*, 14*ii*, 14*iii* and the choice to use a location server is performed when the application runs.

Figure 4:
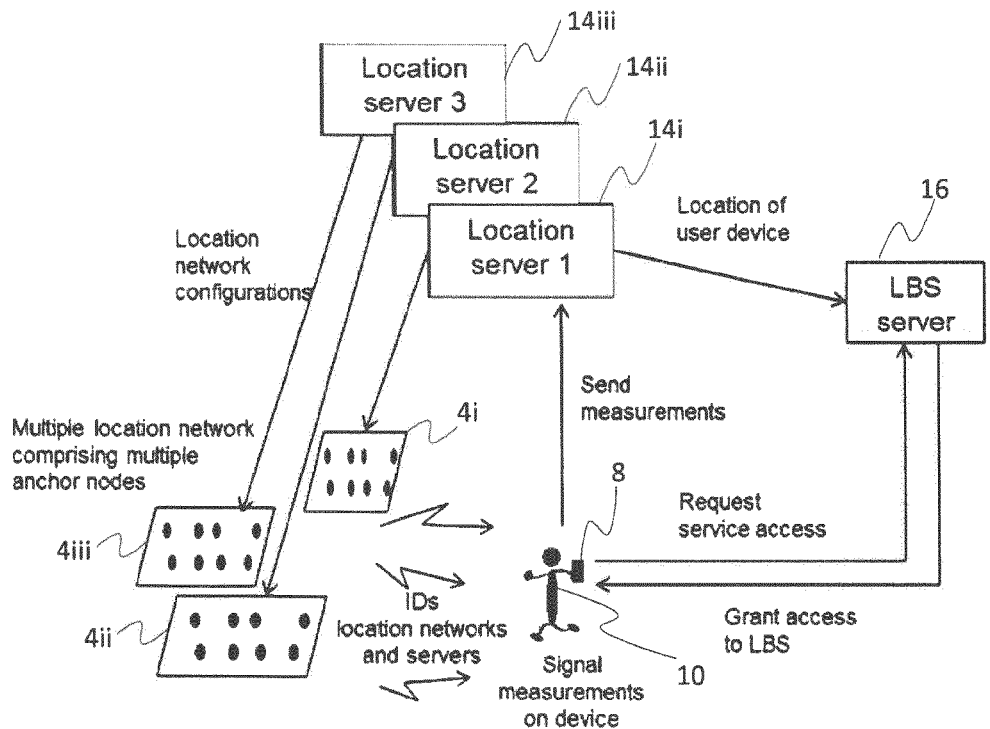
FIG. 4 is a schematic block diagram of a system for providing a plurality of location based services based on a plurality of location networks.

FIG. 4 shows a second embodiment of the present disclosure, in a scenario where each location server 14*i*, 14*ii*, 14*iii* has its own associated location network 4*i*, 4*ii*, 4*iii* deployed in a location respectively. The location networks 4*i*, 4*ii*, 4*iii* in this case each transmit a location network ID and/or the respective location server ID, which the mobile device 8 may use to identify existing positioning services at the location, and choose one or more of them to use (and therefore share information with). As in the previous embodiment, the choice made on the mobile device 8 may be based on a user selection, or a pre-existing trust relationship, or due to configuration on the device. Further, again one or more particular applications on the device may have preference to use one or more particular location servers with the choice to use a location server being performed when the application runs.

FIGS. 3 and 4 illustrate scenarios where the mobile device 8 selects which location server(s) 14*i*, 14*ii*, 14*iii* to share positioning information with, where the positioning information in this case takes the form of measurements taken by the mobile device 8 from signals received from the nodes 6, and this is shared with the server 14 for the purposes of an assisted localization. In this case the provider is the owner or operator of the assisted localization service run from the respective location server 14, and the IDs 24 embedded in the signals are IDs of the assisted localization provider (e.g. of their server). The mobile device 8 can use these to decide whether to use the services of a given location server 14—if the mobile device 8 encounters signals from anchor nodes 6 with an ID it does not recognize or does not trust, the device 8 can refrain from using the associated assisted location service available at its present location.

Similarly, if the mobile device 8 needs to refer to a location server 14 to look up the locations of nodes 6 it encounters (from which the server 14 could potentially infer the device's rough location), the embedded IDs 24 will help the device 8 to determine which location server(s) it trusts to share such information with.

A similar technique is also applicable in other scenarios. For example, each location server 14i, 14ii, 14iii could be associated with a different respective location based service provided from an LBS server 16, or each could be associated with a different respective location based service provided from a different respective one of multiple LBS servers 16i, 16ii, 16iii (not shown). In this case, the mobile device 8 submits its measurements to the server 14, or submits its locally calculated location in a fully device centric case, and the location server 14 then forwards the device's location to the relevant LBS server 16. The provider in question is then the provider of the location based service, and the IDs from the nodes 6 may identify a provider that the location network 4 is associated with.

In another scenario, there could be one or no location servers 14 but multiple LBS servers 16 providing location based services from different respective providers. The mobile device 8 may receive its location back from the location server 4 (in an assisted case) or compute its own location without involvement of any location server 14 (in a fully device centric case), then use the provider IDs it hears from nodes 6 it encounters in a location network 4 to decide which LBS server(s) 16 associated with that location network it trusts.

Further, note it is not necessary that the mobile device 8 encounters multiple IDs at any one time or place, or that any given signal is embedded with more than one ID. Even if the mobile device 8 encounters a signal from a node 6 with a single provider or network ID, this can still be used by the mobile device 8 to determine whether or not it is desired to use the corresponding service or location network.

In a network-centric system, the location network 4 performs signal measurements on the signals generated by the mobile device 8 and received by the nodes 6, and computes the device's position at a location server 14. The location server 14 may then return the determined location back to the mobile device 8, and/or pass it to an LBS server 16. If returned to the mobile device 8, the device 8 may use the location internally and/or forward it to an LBS server 16.

In various such scenarios, it may be desired to preserve the privacy of a mobile device 8 in the sense of choosing which location servers 14, LBS servers 16 and/or location networks 4 can position it, and disallowing any others. However, in the network centric case the mobile device 8 has even less control over the positioning phase.

To address this, in embodiments there is provided a network centric-positioning system in which a mobile device 8 can send a pre-defined message specifying that positioning not be performed. Such techniques may require regulation or standardization so that all parties adhere to these requests. The mobile device 8 thus allows or disallows its positioning by sending a pre-determined track or do-not-track information element which all location networks 4, 14 in the vicinity use to determine whether they should position the device 8, and/or which any server 14, 16 uses to determine whether it should make use of the location. The track or do-not track information may contain additional information to prevent spoofing by unauthorized parties.

Figure 8:
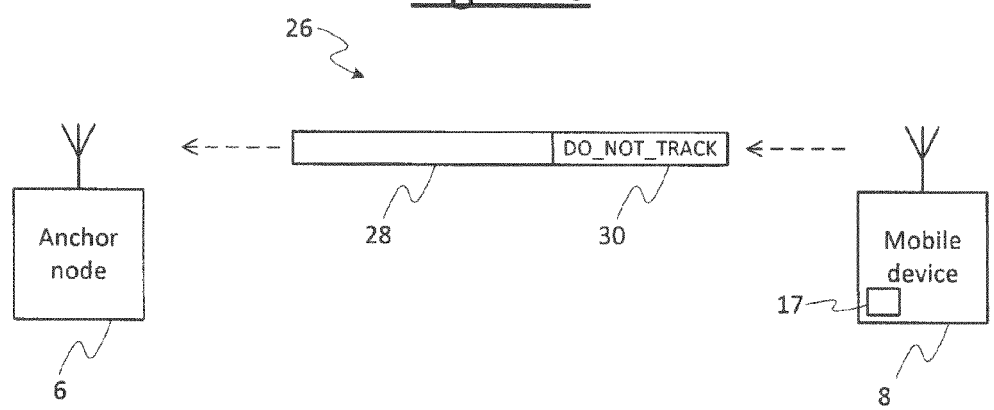
FIG. 8 is another schematic representation of a message format.

FIG. 8 illustrates an example message format which may be used to broadcast the transmission from the mobile terminal 8. This may be a predetermined format, e.g. standardized according to a particular localization standard to which multiple mobile device suppliers or application developers adhere. The message format may be implemented at any suitable protocol layer of the protocol stack, e.g. at the application layer. A message 26 of this format may be transmitted repeatedly from the mobile device, e.g. periodically (at regular intervals) or in response to events.

As shown schematically, each message 26 emitted from the mobile device 8 may comprise a first portion 28 comprising one or more first fields reserved for signaling the actual beaconing signal that will be used by the location network 4 to take signal measurements and thus determine the device's location. This first portion 28 of the message 26 may comprise any signal that can be used in the localization of a mobile device 8, e.g. for a node 6 of the location network 4 to take a signal strength or time-of-flight measurement. For example this portion 28 of the message 26 may comprise a predetermined pattern that can be recognized by the nodes 6, and/or a timestamp marking the time the message 26 was transmitted from the mobile device 8.

In addition, the message 26 comprises a second portion 30 comprising a second field, in the form of a tracking preference field reserved for specifying the tracking preference of the mobile device 8. The location module 9 of the mobile terminal 8 comprises a location preferences module 17 which is configured to insert the preference into this dedicated second field for transmission, e.g. based on a user setting, application, manufacturer setting or default setting of the mobile device 8. In embodiments, the tracking preference specifies whether the mobile device 8 permits the signal(s) it emits to be used by a location network 4, 14 to determine the location of the mobile device 8 at all. Alternatively, the location network 4, 14 may still determine the location in that it still automatically performs the underlying calculations, but the tracking preference specifies whether a server 14, 16 is permitted to use the location in any meaningful or practical way.

Either way, there are different ways the tracking preference may specify whether such permission is given. In embodiments, the second field 30 may comprise an explicit preference one way or the other, i.e. it comprises an explicit negative indicator (e.g. called DO_NOT_TRACK) if the mobile device 8 does not give permission and an explicit positive indicator (e.g. called ALLOW_TRACK) if the mobile device does give permission. For example this could be implemented in the message as a one bit field. Alternatively the message 26 may comprise an explicit second field 30 when permission is given, and the absence of the second field 30 specifies that permission is withheld; or vice versa, the message 26 may comprise an explicit second field 30 when permission is withheld, and the absence of the second field 30 specifies that permission is allowed.

Note that it is not essential in all possible implementations that the transmission from the mobile terminal 8 takes the predetermined format of FIG. 8. For example, in other implementations the tracking preference may be included in the transmission in an asynchronous fashion, as long as there is some protocol for associating it with the signal.

Figure 5:
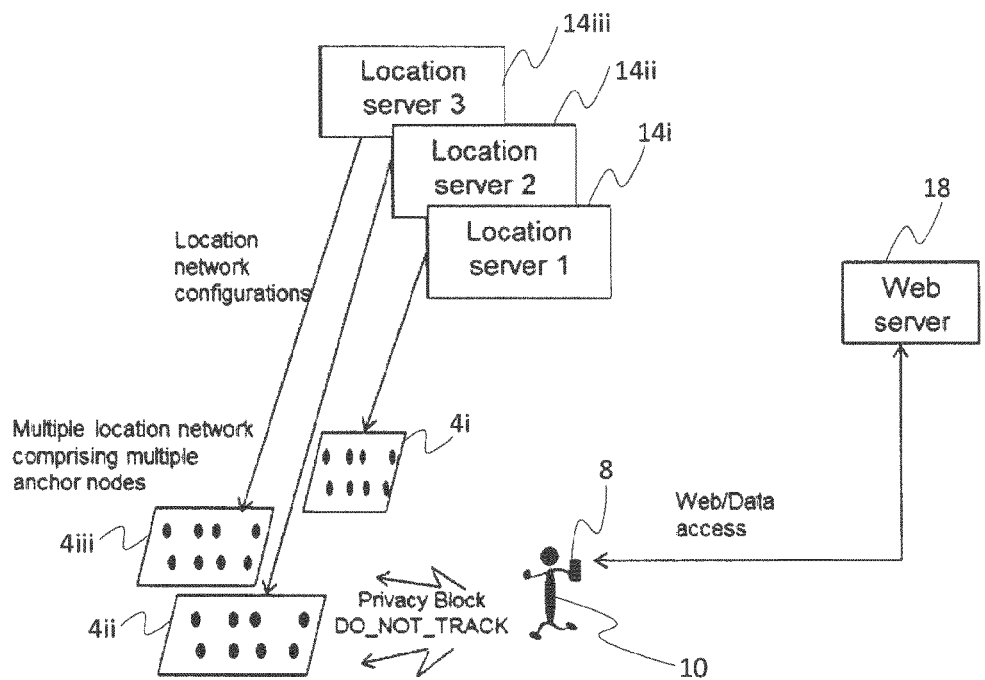
FIG. 5 is another schematic block diagram of a system for providing a plurality of location based services based on a plurality of location networks.

FIG. 5 shows a third embodiment of the present disclosure, in a network centric scenario where a mobile device 8 does not wish to be positioned or tracked by any of multiple location networks 4i, 4ii, 4iii in a particular space (or their respective location servers 14i, 14ii, 14ii or LBS server(s) 16). The mobile device 8 could completely switch off all its radio interfaces to avoid tracking. However, it may in fact be desired that the mobile device 8 can still use its radio interface for data exchange and therefore is switched on. In this case, the mobile device 8 transmits a pre-defined beacon containing a privacy block message (e.g. do-not-track) to inform that it does not want to be positioned or tracked. On receiving these beacon transmissions, the location networks 4, 14 will look up a policy configuration to decide what actions to perform. Such actions may be determined by regulations, standardization or by a location server or network owner or operator. Some possible actions that may be configured are, for example: not to initiate any positioning, or to gather and store measurements for pre-defined time but prohibit from processing these measurements until an authority approves it (for e.g. law enforcement).

In further embodiments, the location network 4 may transmit a location network and/or location server ID, and the mobile device 8 selectively allows or disallows positioning by specific location networks 4*i*, 4*ii*, 4*iii* (or their respective location servers 14*i*, 14*ii*, 14*ii* or LBS server(s) 16) by embedding a track or do-no-track information associated with the location network and/or location server ID in its transmissions. This selective track or do-not-track information is used by the specific location network 4, 14 to determine whether it should position the device, and/or by a server 14, 16 of a service provider to determine whether it should make use of a location determined by a location network 4. The ID and the track/do-not-track information may contain additional information to prevent spoofing by unauthorized parties.

Each anchor node 6 broadcasts the ID in a similar manner to that discussed in relation to FIG. 7, using the second field 24 to indicate the ID of the provider or network, and this is received by the mobile terminal 8 as it encounters the nodes 6 of various location networks 4. The mobile terminal 8 can then echo the ID back in association with a tracking preference in order to indicate that that preference is intended for the particular network 4 or provider identified by that ID.

Figure 9:
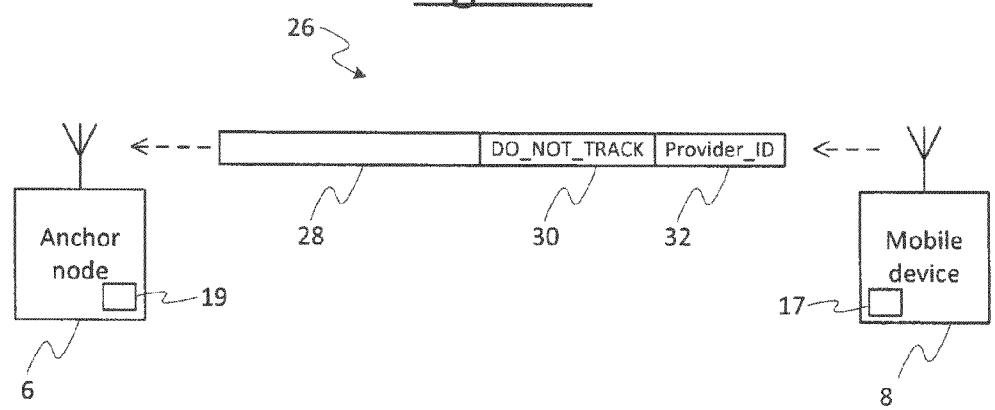
FIG. 9 is yet another schematic representation of a message format.

FIG. 9 illustrates an example message format which may be used to broadcast the transmission from the mobile terminal 8. The message format is similar to that of FIG. 8, except that the message 26 comprises an additional field 32 associated with the tracking preference 30. This extra field 32 is reserved for specifying an ID of a location network 4 or provider of a location related service. Thus the tracking preference is tagged with an ID of a location network or provider at which the tracking preference is aimed. In embodiments, the tracking preference field 28 of the message 26 may comprise one or more instances of the tracking preference (each of which can specify permission or no permission independently), and the extra field 32 may comprise one or more respective network or provider IDs associated with each preference. Again in embodiments the message may be of a predetermined format, e.g. standardized, implemented at any layer of the protocol stack; and may be emitted by the mobile terminal 8 repeatedly, e.g. periodically.

Figure 6:
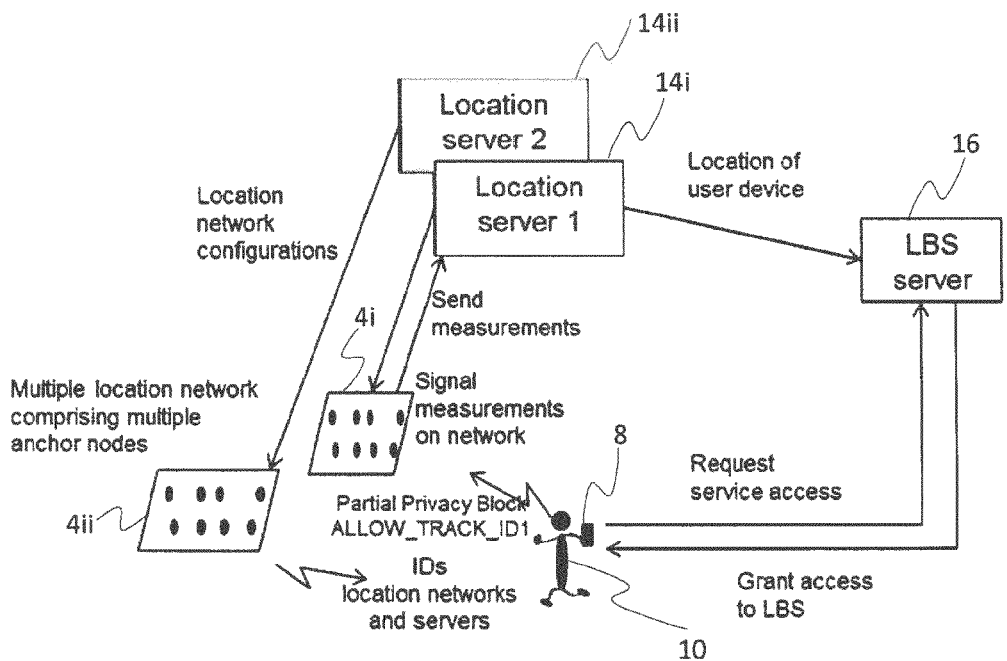
FIG. 6 is yet another schematic block diagram of a system for providing a plurality of location based services based on a plurality of location networks.

FIG. 6 shows a third embodiment of the present disclosure, in a network-centric scenario where more than one location provider is found a given space. This could be with one location network 4 shared by multiple location servers 14*i*, 14*ii*, 14*iii*, or different location networks 4*i*, 4*ii*, 4*iii* belonging to each location server 14*i*, 14*ii*, 14*iii* respectively (similarly to the first and second embodiments but network centric). In this embodiment the aim of the mobile device 8 is to allow positioning or tracking by one or more specific location providers while preventing one or more other location providers from positioning or track the device 8.

To achieve this, the location networks send a unique location network and/or location server ID(s) 32 that identifies existing location networks 4 and/or server 14 to the devices in the present location. On receiving these location server IDs, the mobile device 8 chooses one or more of these location providers. The choice on the mobile device 8 can be based on the user selection, or a pre-existing trust relationship, or due to configuration on the device 8. Further, particular applications on the device may have preference to use particular location servers and the choice to use a location server is performed when the application runs.

Once the choice is made on the mobile device 8, it transmits a pre-determined beacon containing a partial privacy block such as a track enabled message for one or more selected location networks 4 and/or servers 14 and do-not-track message for one or more other location networks 4 and/or servers 14. The beacon message can explicitly inform which providers are allowed to position and which are not allowed to position, or it could send one of these options (either track or do-not-track) and implicitly the non-defined location servers 14 have to perform the implicit opposite action.

On the location network side, on receiving these beacon transmissions, the network 4, 14 will look up a policy configuration to decide what actions to perform. Such actions may be for example: for tracking allowed, to perform normal positioning; and for do-not-track (as in the third embodiment), to be either determined by regulations or by location server or network owner or operator. Some possible actions that could be configured are: not to initiate any positioning, or gather and store measurements for a pre-defined time but prohibit from processing these measurements until an authority approves it (for e.g. law enforcement).

FIGS. 5 and 6 show an example where location networks 4 and/or their associated location servers 14 determine whether to track a mobile device based on the tracking preference. In embodiments this may be implemented in each individual node 6 of the location network 4, so that the node 6 does not even transmit measurements to the corresponding location server 14 if the node 6 detects a do-not-track. Alternatively, the tracking preference may be recognized in the location server 14, so that it receives the measurements from the nodes 6 but refrains from using them to determine the mobile device's location if it detects a do-not-track. In another alternative, the location server 14 may calculate the location but refrain from doing anything with it, e.g. refrain from forwarding to any LBS servers 16.

In another scenario, each location server 14*i*, 14*ii*, 14*iii* could be associated with a different respective location based service provided from an LBS server 16, or each could be associated with a different respective location based service provided from a different respective one of multiple LBS servers 16*i*, 16*ii*, 16*iii* (not shown). In this case, the tracking preference may be recognized in the LBS server 16. While the location server 14 may still determine and forward the location of the mobile device, if the LBS server 16 detects a do-not-track it will refrain from using that location.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that

The invention claimed is:

1. A mobile device, comprising:
 a transmitter arranged to transmit a signal for use by one or more location networks to determine a location of the mobile device; and
 a location preferences module configured to include in the transmission from the transmitter, in association with said signal, a tracking preference comprising an explicit tracking indication specifying whether a location network is permitted to use said signal to determine the location of the mobile device, and/or whether a provider of a location related service associated with a location network is permitted to make use of the location of the mobile device; and
 a receiver configured to receive a respective identifier of each of a plurality of location networks and/or providers, each provider being a provider of at least one respective location related service associated with one of said one or more location networks;
 wherein the tracking preference is dependent on the location network or provider as identified by said identifier;
 wherein the location preferences module is configured to include in association with said signal: an instance of the tracking preference tagged with more than one of the identifiers to specify the permission permitted to each respective location network or provider, or more than one instance of the tracking preference each tagged with one of the identifiers to specify the permission permitted to each respective location network or provider.

2. The mobile device of claim 1, wherein the tracking preference is set by a user of the mobile device.

3. The mobile device of claim 1, wherein the transmitter is configured to transmit according to a predetermined format comprising one or more first fields designated to transmit the signal for use in said location determination, and a tracking preference field designated for specifying the tracking preference, the location preference module being configured to include said instances of the tracking preference in said tracking preference field.

4. The mobile device of claim 1, wherein said signal is for use by each of a plurality of location networks to determine the location of the mobile device.

5. The mobile device of claim 1, wherein the location preferences module is configured to include different instances of the tracking preference each tagged with the identifier of a different one of the providers, and wherein the location related service of each of the providers is associated with a same one of said one or more location networks.

6. The mobile device of any of claim 1, wherein the location preferences module is configured to include different instances of the tracking preference each tagged with the identifier of a different one of the providers, wherein said signal is for use by each of a plurality of location networks to determine the location of the mobile device, and wherein the location related service of each of the providers is associated with a different respective one of the location networks.

7. A network element of a location network, the location network being operable to determine a location of a mobile device based on signals received from the mobile device by nodes of the location network; wherein:
 a respective identifier identifies each of a plurality of location networks including said location network, and/or each of a plurality of providers each being a provider of at least one respective location related service associated with one of the location networks;
 the network element is configured to receive, in association with said signal, an instance of a tracking preference comprising an explicit tracking indication tagged with more than one of the identifiers, or more than one instance of the tracking preference each tagged with one of the identifiers;
 the tracking preference specifies whether the respective location network is permitted to use said signal to determine the location of the mobile device, and/or whether the respective provider o is permitted to make use of the location of the mobile device; and
 the network element is configured to respect one of the instances of the tracking preference if tagged with the identifier of its respective location network and/or provider.

8. The network element of claim 7, wherein the network element is a location server which determines the location of the mobile device based on the signals received by the nodes.

* * * * *